(12) United States Patent
Tashiro et al.

(10) Patent No.: US 8,731,808 B2
(45) Date of Patent: May 20, 2014

(54) ROAD NETWORK ANALYSIS SYSTEM

(71) Applicants: Zenrin Co., Ltd., Kitakyushu (JP); Toyota Jidosha Kabushiki Kaisha, Toyota (JP); Aisin AW Co., Ltd., Anjo (JP)

(72) Inventors: Hiroyuki Tashiro, Kitakyushu (JP); Yukiko Katsuki, Kitakyushu (JP); Naoki Ushijima, Kitakyushu (JP); Motohiro Nakamura, Toyota (JP); Kazunori Watanabe, Toyota (JP); Sadahiro Koshiba, Okazaki (JP); Kazuteru Maekawa, Okazaki (JP)

(73) Assignees: Zenrin Co., Ltd., Kitakyushu-shi, Fukuoka (JP); Toyota Jidosha Kabushiki Kaisha, Toyota-shi, Aichi (JP); Aisin AW Co., Ltd., Anjo-shi, Aichi (JP)

( * ) Notice: Subject to any disclaimer, the term of this patent is extended or adjusted under 35 U.S.C. 154(b) by 0 days.

(21) Appl. No.: 13/944,770

(22) Filed: Jul. 17, 2013

(65) Prior Publication Data

US 2013/0345955 A1   Dec. 26, 2013

Related U.S. Application Data

(63) Continuation of application No. PCT/JP2012/050880, filed on Jan. 17, 2012.

(30) Foreign Application Priority Data

Jan. 19, 2011   (JP) ................................. 2011-009158

(51) Int. Cl.
*G08G 1/00*   (2006.01)

(52) U.S. Cl.
USPC ............ 701/118; 701/414; 701/423; 701/430

(58) Field of Classification Search
USPC ......... 701/117–119, 408–411, 414, 423, 430; 340/934, 995.11–995.13
See application file for complete search history.

(56) References Cited

U.S. PATENT DOCUMENTS

| 7,536,254 B2 * | 5/2009 | Kumagai et al. ............... 701/117 |
| 7,899,612 B2 * | 3/2011 | Kumagai et al. ............... 701/117 |
| 8,103,435 B2 * | 1/2012 | Yang et al. ..................... 701/117 |
| 2006/0058940 A1 | 3/2006 | Kumagai et al. |
| 2006/0064234 A1 | 3/2006 | Kumagai et al. |

FOREIGN PATENT DOCUMENTS

| JP | 9-243391 | 9/1997 |
| JP | 2004-77360 | 3/2004 |
| JP | 2006-79483 | 3/2006 |
| JP | 2006-85511 | 3/2006 |

* cited by examiner

*Primary Examiner* — Russell Frejd
(74) *Attorney, Agent, or Firm* — Beyer Law Group LLP

(57) ABSTRACT

A road network analysis system detects major changes in a road network based on probe information from a plurality of vehicles. The probe information is tabulated and the change in the amount of traffic is calculated for each road with a predetermined time interval. If a remarkable change in the amount of traffic is detected for a road before and after a specific baseline day, it is determined that a major change in the road network affecting the traffic has occurred in the vicinity of the road, and the road is specified as a change-related road. A path search may be performed between the endpoints of a plurality of change-related roads, and the searched paths that have the most overlap with the searched paths are selected so as to identify the change-related roads which are commonly affected by the same cause and the endpoints thereof.

4 Claims, 10 Drawing Sheets

ROAD NETWORK ANALYSIS SYSTEM

CLAIM OF PRIORITY

The present application is a Continuation of International Application No. PCT/JP2012/050880 filed on Jan. 17, 2012, which claims benefit of Japanese Patent Application No. 2011-009158 filed Jan. 19, 2011. The entire contents of each application noted above are hereby incorporated by reference.

BACKGROUND OF THE INVENTION

1. Field of the Invention

The present invention relates to technology of analyzing a change in road network, based on probe information regarding the traveling path of probe cars.

2. Description of the Related Art

Probe information regarding the traveling path of probe cars is effectively used for upgrading map data. The probe car is a vehicle that momentarily detects its own location by, for example, GPS (Global Positioning System) and sends the detection record via a network. Japanese Laid-Open Patent No. JP H09-243391A discloses a technique of registering an unregistered road into map database when obtaining traffic information of the unregistered road from the probe cars three or more times.

BRIEF DESCRIPTION OF THE DRAWINGS

Prompt upgrading of the map data may not be necessary for all the roads. Information, such as opening a new main road to traffic or closing or blocking an existing main road, generally has significant effects on the users and is thus required to be reflected on the map data promptly. The proposed technique can detect opening of a new road but cannot judge the effects on the users. The field survey of all the roads is time and labor consuming.

In order to solve the foregoing problem, the object of the invention is to enable detection of a significant change in road network that affects the users and requires prompt reflection on map data.

Figure 1:
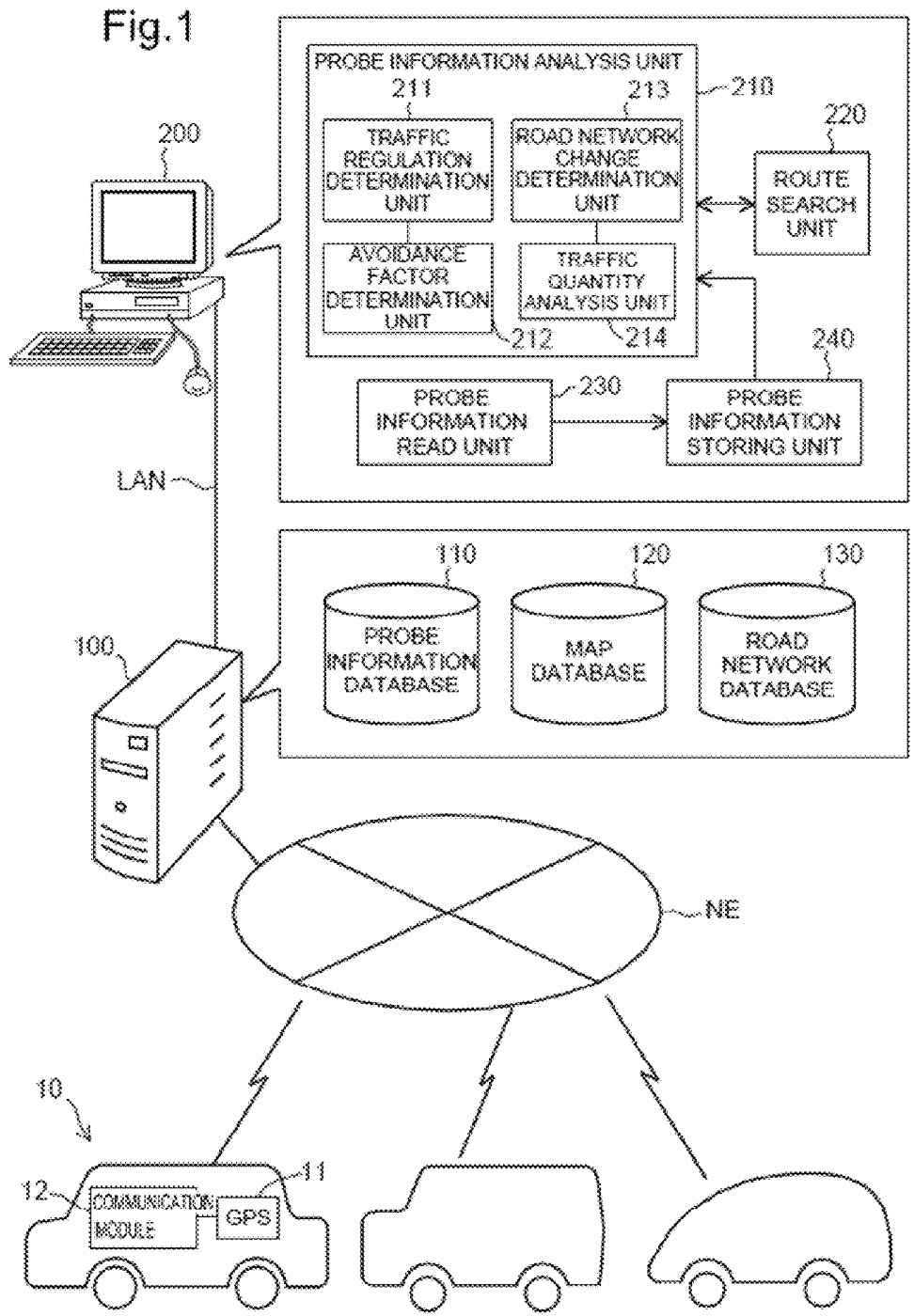

According to one aspect of the invention, there is provided a road network analysis system that analyzes a change in road network, based on probe information regarding a traveling path. The road network analysis system of the invention includes a probe information storing unit, a road network data storing unit, a traffic quantity analysis unit and a road network change determination unit.

The probe information storing unit stores probe information in time series. The probe information of each vehicle may not necessarily regard the traveling path stored continuously but may regard the traveling path stored discretely. It is preferable to store probe information with respect to a plurality of vehicles.

The road network data storing unit stores road network data representing a road network. The road network data includes nodes and links respectively representing intersections and roads and may additionally include attribute of each intersection or road, such as the type and the width, and existing traffic regulation information.

The traffic quantity analysis unit reads probe information of a road network in a target area to be analyzed with respect to predetermined time periods before and after a specified reference time from the probe information storing unit and correlates the read probe information to the road network data to calculate a traffic volume with respect to each of existing roads of the road network in each of the predetermined time periods before and after the specified reference time. The traffic volume may be calculated with respect to each traveling direction or regardless of the traveling direction. The time period for calculation of the traffic volume may be set arbitrarily as long as the time period is sufficient to indicate the tendency of a change in traffic volume. The traffic quantity analysis unit may not necessarily calculate the traffic volume in a continuous time period but may calculate the traffic volume in discretely set time periods.

The road network change determination unit specifies a change-related road, based on the traffic volumes before and after the specified reference time. The change-related road herein means a road recognized to have a change in road network in its neighborhood. More specifically, the road network change determination unit compares the traffic volume in the predetermined time period before the specified reference time with the traffic volume in the predetermined time period after the specified reference time with respect to each road and specifies the road having a change in traffic volume that is equal to or greater than a predetermined value, as the change-related road.

The predetermined value used for determining whether or not each road is the change-related road may be set arbitrarily. A large predetermined value limits the target of detection as the change-related roads to a range that has significant influences on the traffic. A small predetermined value, on the other hand, expands the target of detection to a wider range that has only little influences on the traffic and increases the number of roads detected as the change-related roads. The predetermined value may be set to balance between such results.

The specified reference time may be specified by the operator, based on information regarding, of example, opening of a road.

The configuration of the invention detects a change in traffic volume of each existing road based on the probe information and determines a change in road network based on the results of detection. For example, opening of a new main road to traffic causes a change in surrounding traffic flow, for example, increasing the traffic volume on the connecting roads connected to the main road for the purpose of using the new main road and decreasing the traffic volume on the conventionally used roads. Closing or blocking a main road having relatively heavy traffic similarly causes a change in surrounding traffic flow. Opening of a narrow street having an extremely light traffic, on the other hand, does not cause any significant change in surrounding traffic flow. The technique of the invention detects a change in road network having significant influence on the traffic by focusing on the change in traffic volume on the existing road.

After specification of the change-related roads, the technique of the invention performs field survey in the neighborhood of the specified change-related roads to detect a change in road network, e.g., opening a new road and closing or blocking the existing road and enables the detected change in road network to be promptly reflected on map data.

The traffic quantity analysis unit may selectively read the probe information based on an attribute of the road network in the target area to be analyzed. The attribute of the road network may include information regarding the purpose of use of the road network, for example, tourist spot, playground or entertainment spot, or business district. The traffic quantity analysis unit may selectively read the probe information with restricting the target period or the target days of the week according to the attribute of the road network, for example, tourist season for the tourist spot, holidays for the playground or entertainment spot, or weekdays for the business district. This enables the influence on the main users to be accurately investigated.

The attribute information may also be the type of the road and the road width. In this application, the traffic quantity analysis unit may specify the type of vehicles allowed to pass according to the road width and selectively read the probe information regarding the specified type of vehicles. In the case of a road network including a high ratio of relatively narrow roads, the traffic quantity analysis unit may read the probe information excluding heavy vehicles.

The traffic quantity analysis unit may also normalize the read probe information, based on a total number of the probe information in each of the predetermined time periods. In an application that the probe information is stored in time series in each predetermined unit time, the traffic quantity analysis unit may perform normalization by using a total number of the probe information in the predetermined unit time. The unit time may be set arbitrarily, for example, the date unit or the time unit. When the total number of probe information varies by the term, the variation of the total number affects the traffic volume. Normalization by dividing the probe information by the total number reduces the influence of the total number and enables the change in traffic volume to be accurately determined.

When a plurality of roads are specified as the change-related roads, it is highly possible that these change-related roads have a common influencing factor by one change of the road network, such as opening a new main road. Specifying the change-related roads having the common influencing factor on the traffic change can narrow the area where the road network has a change.

The road network analysis system may further include a route search unit configured to perform route search between two points specified based on the road network data and may set survey route candidates for investigating a change in road network by the following method. The method first specifies end points of a plurality of the change-related roads, subsequently controls the route search unit to perform route search between end points of different change-related roads and extracts a route overlapped with the change-related road from routes found by the route search.

When a route found by the route search between the end points of two change-related roads is overlapped with any of the change-related roads, it is highly possible that these change-related roads are commonly affected by one single change in road network. Setting a route connecting these change-related roads as a survey route enables a change in road network to be efficiently found.

After finding such survey route candidates, the following method may further be adopted to limit the range of the survey route candidates. The method first excludes either the change-related road of the increased traffic volume or the change-related road of the decreased traffic volume from the object of search. The method subsequently controls the route search unit to perform route search between respective end points of the found survey route candidates, and extracts any route overlapped with the remaining change-related road among the routes found by the route search. When the change-related road of the increased traffic volume is excluded, a route overlapped with the change-related road of the decreased traffic volume is set as the search route candidate. When the change-related road of the decreased traffic volume is excluded, on the other hand, a route overlapped with the change-related road of the increased traffic volume is set as the search route candidate.

On assumption that the total traffic volume in the road network is substantially constant, an increase in traffic volume in one road causes a decrease in traffic volume in another road or vice versa. The above method performs route search with excluding the change-related road of the increased traffic volume or the change-related road of the decreased traffic volume from the object of search. This specifies the change-related road of the inverse change in traffic volume, i.e., the decreased traffic volume or the increased traffic volume, by the effect of the change in traffic volume of the excluded change-related road. Setting a route overlapped with the remaining change-related road as the search route candidate enables a change in road network affecting the change in traffic volume to be efficiently found.

In the description above, the probe information is used to determine the traffic volume or the rate of change in the predetermined time period. Any of various settings may be allowed for the predetermined time period, for example, the unit of each day, the unit of two days, the unit of seven days or one week, or the unit of 30 days or one month. The target period may not be necessarily in the unit of 24 hours but may be limited to the morning and evening rush hours.

The invention may also be implemented by a road network analysis method performed by the computer to determine a change in road network, as well as a computer program executed by the computer to enable such analysis. The invention may further be implemented by a computer readable storage medium, in which such a computer program is stored. The storage medium may be a flexible disk, a CD-ROM, a magneto-optical disk, an IC card, a ROM cartridge, a punched card, a printed matter with a barcode or another code printed thereon, any of internal storage devices (memories such as RAM and ROM) and external storage devices of the computer, or any of various other computer readable media.

BRIEF DESCRIPTION OF DRAWINGS

FIG. 1 is a diagram illustrating the configuration of a road network system.

Figure 2:
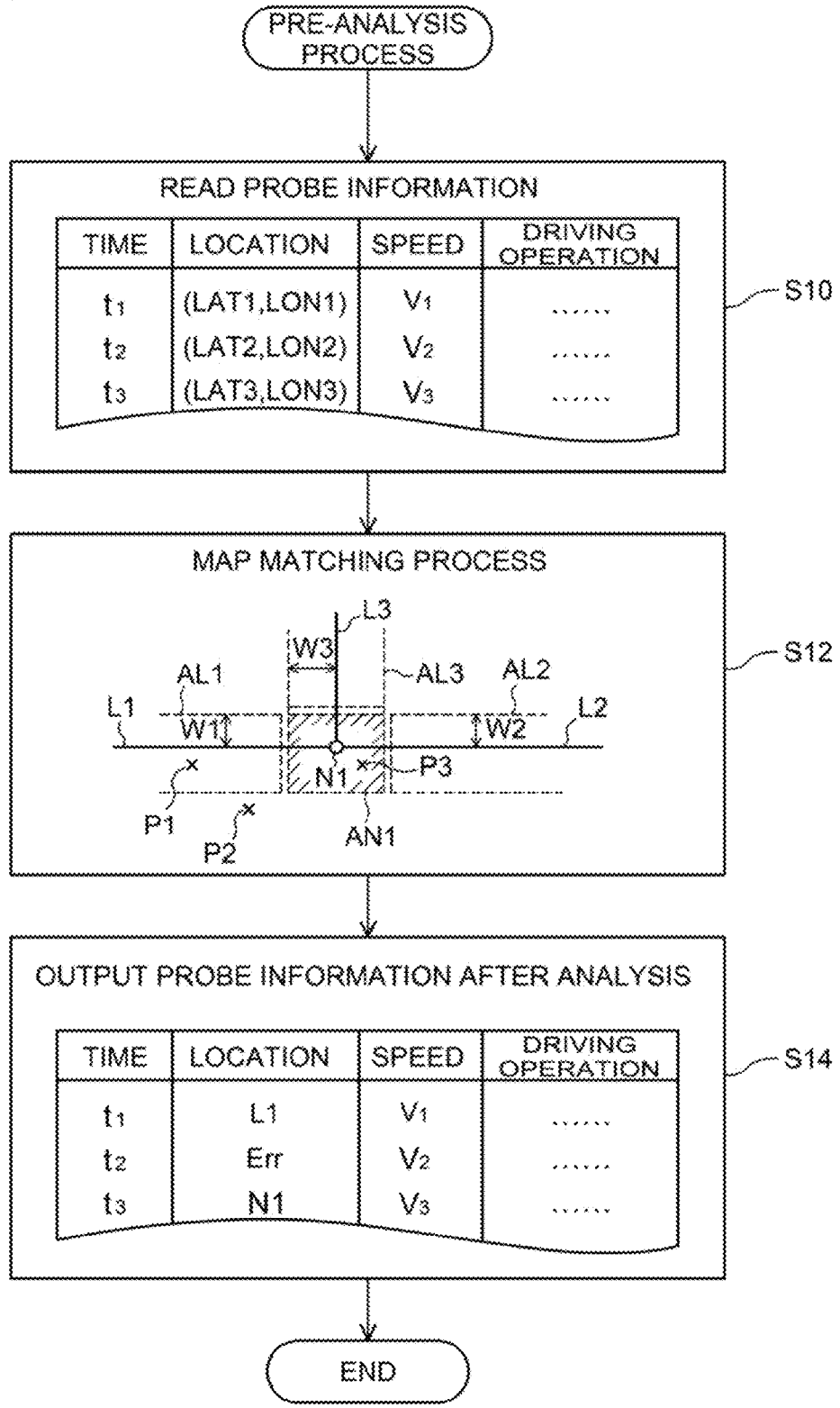

FIG. 2 is a flowchart showing a pre-analysis process of probe information.

Figure 3:
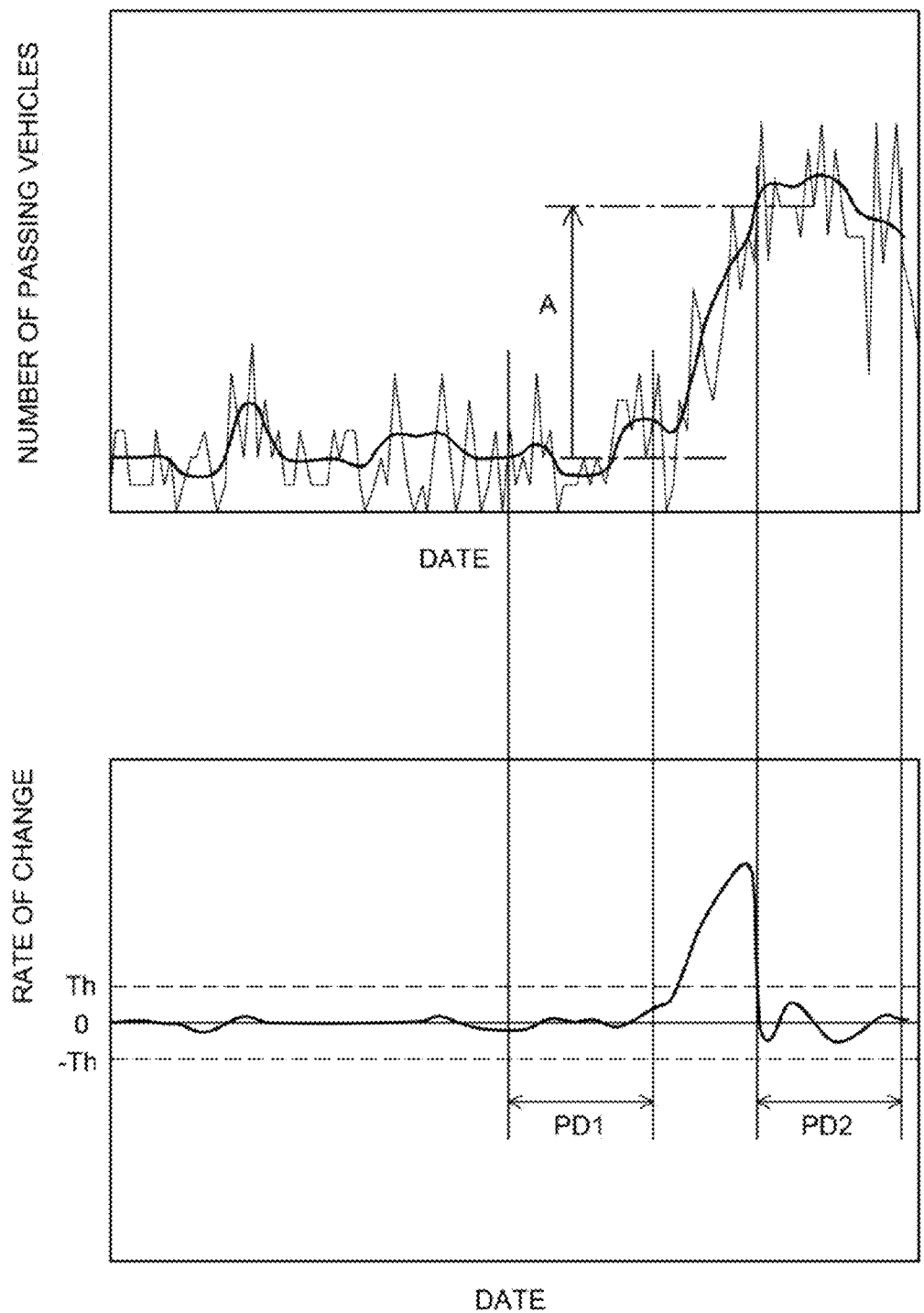

FIG. 3 is a diagram showing the concept of setting a base date.

Figure 4:
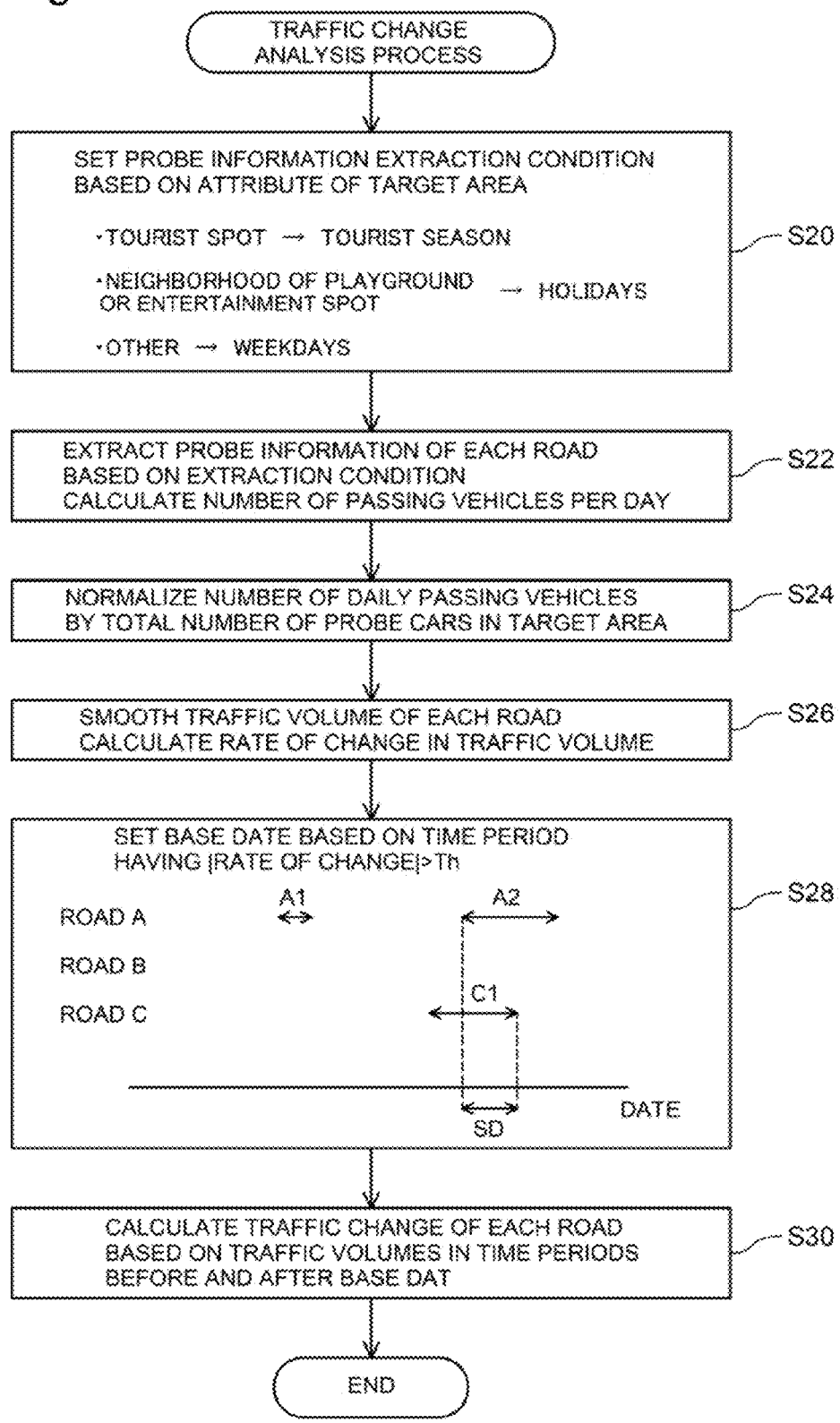

FIG. 4 is a flowchart showing a traffic change analysis process.

Figure 5A:
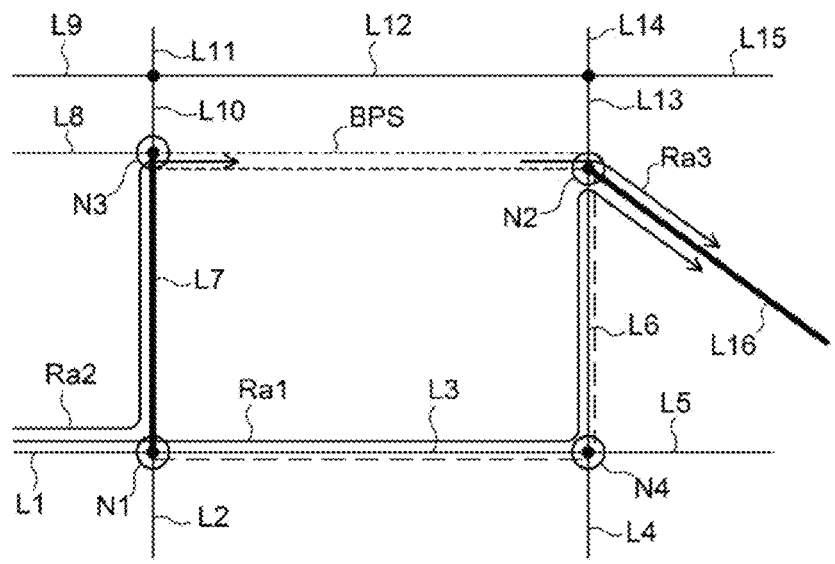
Figure 5B:
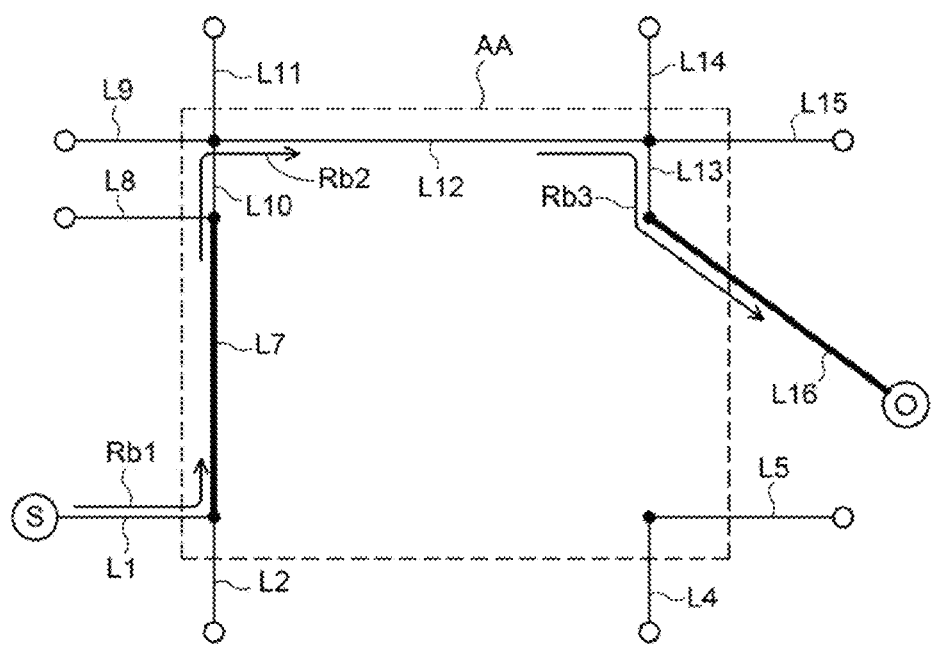

FIGS. 5A and 5B are diagrams showing the concept of setting a survey route.

FIGS. 6A through 6F are diagrams showing the concept of detecting a singular node.

Figure 7:
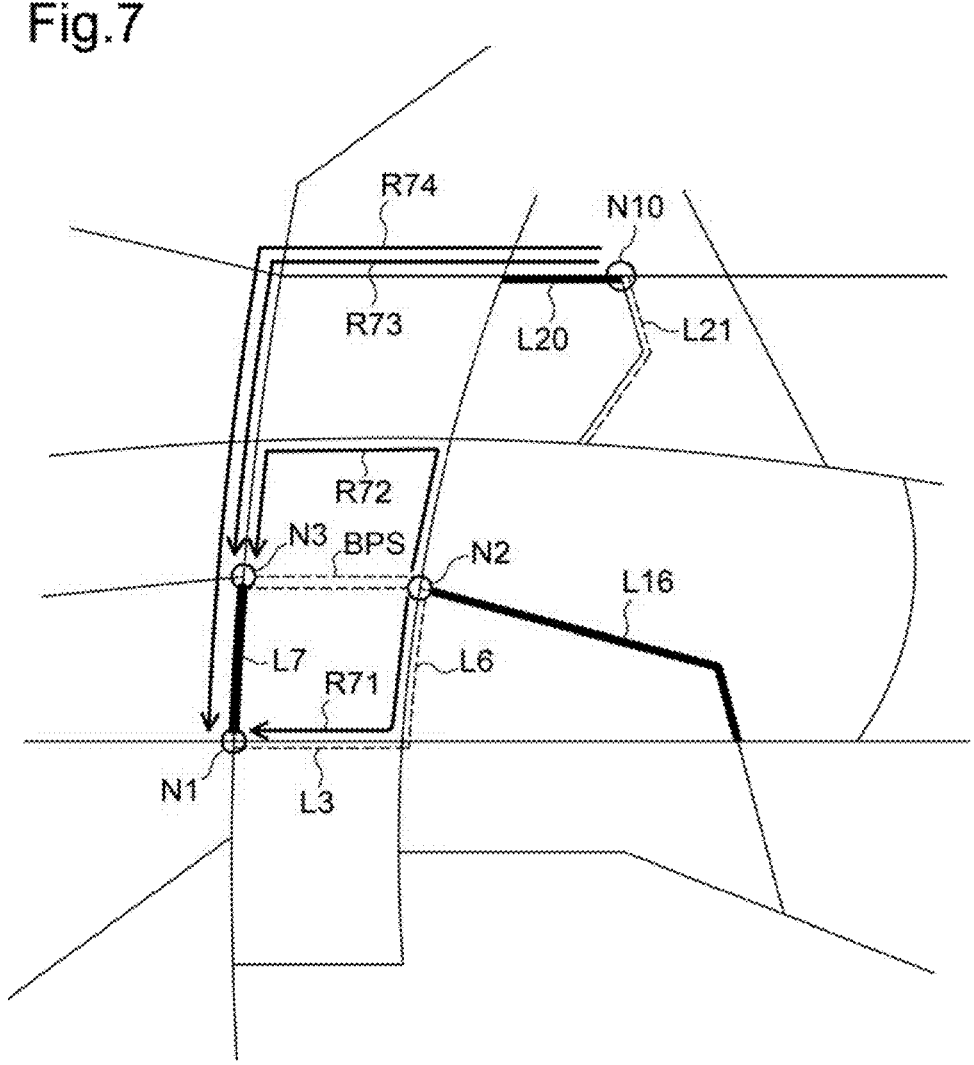

FIG. 7 is a diagram showing the concept of determining relevancy between nodes.

Figure 8:
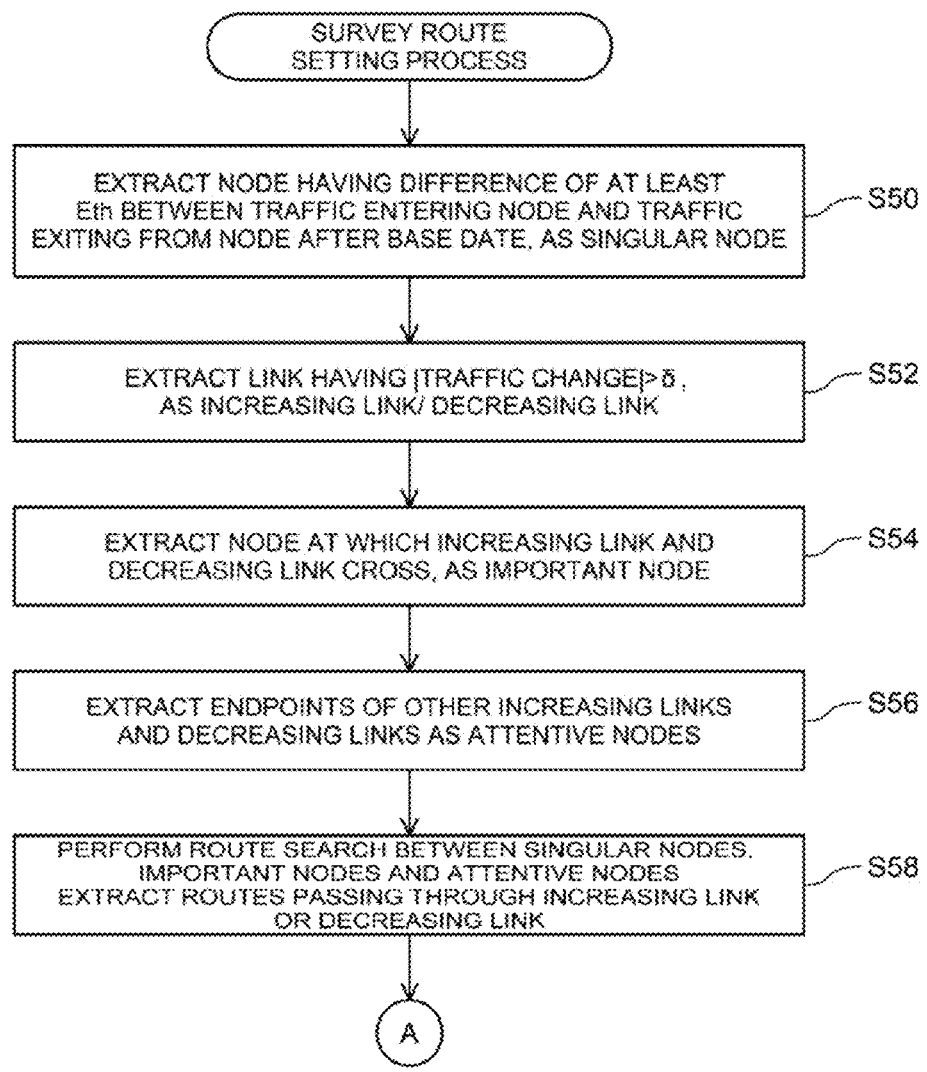

FIG. 8 is a flowchart (1) showing a survey route setting process.

Figure 9:
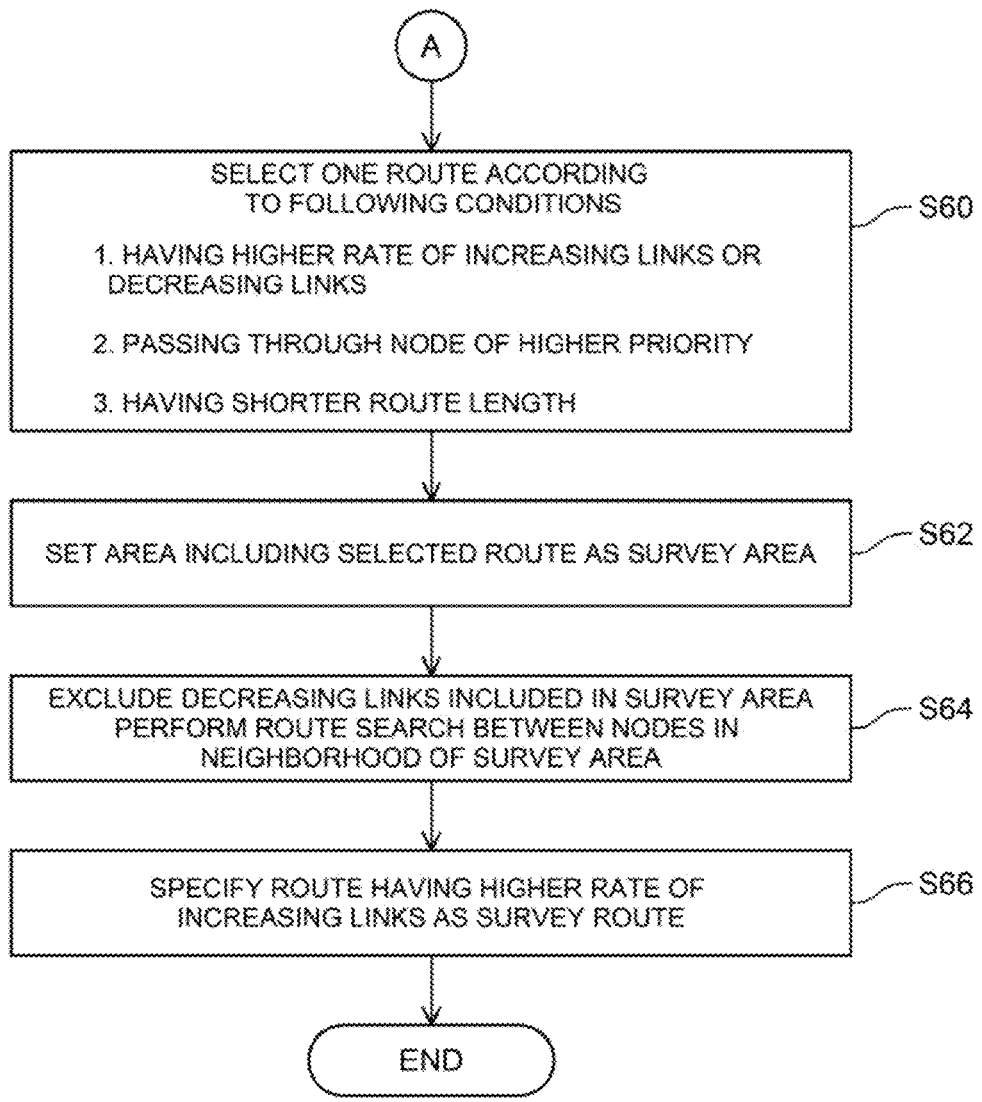

FIG. 9 is a flowchart (2) showing the survey route setting process.

DESCRIPTION OF EMBODIMENTS OF THE INVENTION

Embodiment 1

A. System Configuration

FIG. 1 is a diagram illustrating the configuration of a road network analysis system. The road network analysis system includes an analysis terminal 200 implemented by a personal computer (including a CPU, a RAM, a ROM and a hard disk drive) and a server 100 (including a CPU, a RAM, a ROM and a hard disk drive) with storage of databases. These constituents are interconnected by a network LAN. The analysis terminal 200 and the server 100 may be integrated with each other. Alternatively the functions of the analysis terminal 200 may be processed by a greater number of servers in a distributed manner.

The server 100 stores a probe information database 110, a map database 120 and a road network database 130. The map database 120 stores polygon data used for drawing maps. The map database 120 is used to display the results of analysis on a map in the analysis terminal 200 or to display a map in a navigation system mounted on each probe car 10.

The road network database 130 stores road network data regarding a road network composed of roads and intersections respectively expressed in the form of links and nodes. The road network data may also be used for route search. The road network data is stored along with information regarding the road type such as national road or prefectural road, the road width such as the number of lanes, the regulation on driving direction such as no right turn and no left turn and the traffic regulation such as one-way traffic, with regard to the respective links and nodes.

The probe information database 110 is provided as a database that records the traveling path of each probe car 10 in time series.

The configuration of the probe car 10 is also schematically illustrated. Each probe car 10 is equipped with a GPS (Global Positioning System) 11 that allows position coordinate measurement. Any technique other than GPS may also be employed for position coordinate measurement. The probe car 10 is also equipped with a communication module 12 that sends (or uploads) location information measured by the GPS 11 at specified timings to the server 100 via the network NE. The server 100 stores the received location information with respect to each probe car 10 in the probe information database 110. The information uploaded by the probe car 10 may include the driving speed of the probe car 10 and information on the driving operations of an accelerator, a brake and a steering wheel, in addition to the location information.

The probe information may be uploaded from the probe car 10 to the server 100 at any of various timings. According to this embodiment, in order to collect information effective for analysis, the probe information is uploaded when the probe car 10 is driven at a specified or higher speed and is placed on any of the nodes and links stored in the road network database 130. Determination of whether the probe car 10 is placed on any of such links and nodes is readily achieved by mounting a navigation system, which uses road network data equivalent to the road network database 130, on the probe car 10.

The functions provided by the analysis terminal 200 are also illustrated as a block diagram. These functions are implemented by installation of computer programs for enabling the respective functions in the analysis terminal 200. Alternatively part or all of the functions may be implemented by the hardware configuration.

The following describes the functions of the analysis terminal 200. A probe information read unit 230 reads probe information required for analysis from the probe information database 110 of the server 100 and stores the read probe information into a probe information storing unit 240. The probe information database 110 stores the location information of each probe car 10 in the form of coordinates. According to this embodiment, the probe information read unit 230 performs a pre-analysis process to convert the location information into the form of nodes and links that is easier to use for analysis, and stores the converted location information into the probe information storing unit 240. The details of this pre-analysis process will be described later. In the following description, information processed by the pre-analysis process is called probe information, unless otherwise specified.

A route search unit 220 uses the road network data and performs route search between specified two points. The known Dijkstra's algorithm may be employed for route search. According to this embodiment, the results of route search are used for various analyses by a probe information analysis unit 210.

The probe information analysis unit 210 performs analysis based on the probe information stored in the probe information storing unit 240. The analysis terminal 200 of the embodiment is capable of analyzing the traffic regulations and determining a change in road network.

A traffic regulation determination unit 211 determines the traffic regulations on roads and intersections, based on the probe information. As described previously, traffic regulation information is stored along with the road network data. With respect to a certain road or intersection, however, there is a possibility that the traffic regulation information may be missing, the traffic regulation may newly be imposed, or different traffic regulation from previous regulation may be imposed. The traffic regulation determination unit 211 determines the traffic regulation information based on the probe information, so as to support upgrading of the traffic regulation information correlated to the road network data.

An avoidance factor determination unit 212 detects the presence or the absence and the degree of a factor that keeps the driver from passing through a certain road or intersection. This factor is hereinafter called avoidance factor. The avoidance factor during driving under a specified traffic regulation may be, for example, the narrower width of the next road than the current road, the acute-angled connection of the road to an intersection, the detour known to the user or the access to a closed district away from the major roads. The results of detection by the avoidance factor determination unit 212 are used for analysis by the traffic regulation determination unit 211.

A road network change determination unit 213 determines a change in road network to be reflected on the road network data, based on the daily changes of traffic on the respective roads and intersections obtained from the probe information. A traffic quantity analysis unit 214 statistically calculates the daily traffic on the respective roads and intersections to be used for the above analysis, based on the probe information.

B. Pre-Analysis Process

The analysis terminal 200 performs the pre-analysis process of converting the location information from the coordinates to the form of nodes and links, when reading the probe information stored in the server 100.

FIG. 2 is a flowchart showing the pre-analysis process of probe information. The pre-analysis process corresponds to the processing of the probe information read unit 230 and is executed by the CPU of the analysis terminal 200 as the hardware.

The CPU first reads probe information from the server 100 (step S10). An example of the structure of the probe information is illustrated. In this illustrated example, position coordinates are stored in the form of latitude and longitude coordinates, e.g., (LAT1,LON1) to (LAT3,LON3), in correlation to times t1 to t3. The CPU may additionally read the speeds V1 to V3 and the driving operations.

The CPU performs map matching process on the position coordinates (step S12). The concept of this process is also illustrated. An intersection consisting of links L1 to L3 and a node N1 is provided as an example. Areas AL1 to AL3 respectively having widths W1 to W3 are set for these links L1 to L3, based on the attribute on the road width, such as the number of lanes. The widths W1 to W3 may be set to larger values than the road widths by taking into account measurement error of location information by the GPS. An area AN1 specified by superimposing these areas AL1 to AL3 one on another is set for the node N1. In the illustration, the area AN1 is hatched for better discrimination.

The CPU identifies which of the areas AL1 to AL3 and AN1 includes each set of the position coordinates of the probe information and converts the position coordinates to a link or a node. Points P1 to P3 in the drawing represent the points corresponding to the position coordinates at the times t1 to t3. The point P1 is included in the area AL1, so that its position coordinates are converted to the link L1. The point P2 is out of the area AL1, so that its position coordinates are failed to be converted. The point P3 is included in the area AN1, so that its position coordinates are converted to the node N1.

The CPU outputs the probe information after the above analysis to the probe information storing unit 240 (step S14). The data structure after the analysis is also illustrated. As the result of the analysis, the location information is converted to the link or node: for example, the location information at the time t1 is converted to the link L1 and the location information at the time t3 is converted to the node N1. Since conversion of the position coordinates at the time t2 is failed, error representation (Err) is provided as the location information at the time t2.

C. Traffic Change Analysis Process

This embodiment detects a change in road network, based on the traffic change of the probe information. An estimated date when a change in road network occurs is hereinafter referred to as "base date". The base date may be set manually by the operator based on information provided by administrative bodies but may be set analytically based on a change of the probe information. The following sequentially describes the concept of analytically setting the base date and the traffic change analysis process.

C1. Concept of Setting Base Date

FIG. 3 is a diagram showing the concept of setting the base date. The upper graph shows probe information on the daily basis or more specifically a daily change in number of passing vehicles on a target road to be analyzed. The thin-line graph indicates raw data of probe information, i.e., the summary count of the daily number of passing vehicles. The number of passing vehicles drastically fluctuates on the daily basis, since there is a possibility that all the probe cars may not act on a regular schedule and there is a possibility that some of the traveling path of each probe car may be missing in detection of probe information.

The thick-line graph shows the results of smoothing the number of passing vehicles. Various techniques may be employed for such smoothing. For example, the number of passing vehicles on a certain date may be an average value of the numbers of passing vehicles on three to five days before and after the certain date. A smoothed curve by least squares method or spline curve may be calculated from the raw data. The raw data may be subjected to a low-pass filter for removal of the noise component.

Both the raw data and the smoothed curve clearly show that the number of passing vehicles drastically increases after a certain time period. This procedure aims to analytically specify the date when the number of passing vehicles drastically changes.

After obtaining the smoothed curve, the procedure calculates a rate of change by differentiation. The lower graph shows a rate-of-change curve. Since the smoothed curve still has some fluctuation, the rate-of-change curve generally fluctuates between the plus and the minus. A large positive rate of change appears in a specific time period when the number of passing vehicles drastically increases, while the rate of change has a relatively small fluctuation of absolute value in the other time period.

A threshold value range±Th is set to cover such a small fluctuation in rate of change accompanied with the daily change of probe information. The rate of change exceeding this threshold value Th is determined as a drastic change that appears to be even discontinuous.

The representative date of this specific time period is set as the base date. In order to avoid influence of noise, the procedure may extract only a time period when the rate of change continuously exceeds the threshold value Th over a plurality of days. The representative date may be the first date of the specific time period when the rate of change exceeds the threshold value Th, the last day of the specific time period when the rate of change exceeds the threshold value Th or the middle day of the specific period when the rate of change exceeds the threshold value Th.

After setting the base date, the procedure determines a change in traffic volume before and after the base date. As illustrated, the procedure selects time periods PD1 and PD2 before and after the base date, each consisting of a specified number of days, when the absolute value of the rate of change does not exceed the threshold value Th and calculates average traffic volumes in these selected time periods. The procedure then calculates an amount of change in average traffic volume (corresponding to A in the drawing) and thereby determines a change in traffic volume before and after the base date. The specified number of days used for calculating the average traffic volume may be set arbitrarily.

C2. Traffic Change Analysis Process

FIG. 4 is a flowchart showing the traffic change analysis process. The traffic change analysis process corresponds to the processing of the traffic quantity analysis unit 214 (see FIG. 1) and is executed by the CPU of the analysis terminal 200 as the hardware.

The CPU subsequently extracts probe information of each road included in the target area based on the extraction condition and calculates the number of passing vehicles per day (step S22). The CPU then performs normalization by dividing the number of daily passing vehicles by the total number of probe cars in the target area (step S24). The total number of probe cars in the target area affects the traffic volume of each road. Increasing the total number of probe cars may cause a discontinuous increase in traffic volume of each road, even when there is no substantial change in road network. Normalization reduces this potential influence. The total number of probe cars does not mean the total number of vehicles equipped with the device for sending probe information but means the total number of probe cars that has actually sent the probe information each day.

The normalization process is not essential. When a sufficient number of probe cars are present in the target area, the daily change in total number of probe cars has relatively small influence, so that the normalization process may be omitted. Although this embodiment performs normalization on the daily basis, the total number of probe cars in the specified number of days used for calculation of the average volume may be used for normalization. Additionally, normalization may not be necessarily performed by the day but may be performed using the total number of probe cars in a specified time zone when information of only the specified time zone is effectively used out of the probe information of one day.

After determining the traffic volume per day, the CPU smoothes the traffic volume of each road and calculates a rate of change in traffic volume (step S26). More specifically, the procedure obtains the smoothed curve shown in the upper graph of FIG. 3 and calculates the rate of change shown in the lower graph of FIG. 3. The CPU then specifies a time period when the absolute value of the rate of change exceeds the threshold value Th and sets the base date (step S28). The method of setting the base date is described above with reference to FIG. 3.

An example of processing when the base date is specified for a plurality of roads is shown in the box of step S28 in FIG. 4. Analysis on each road in the target area based on the change in traffic volume may specify the base date for a plurality of roads. In this case, the base date is set, based on an overlapping time period when the results of analysis on the respective roads are overlapped.

For example, as illustrated, the rate of change exceeds the threshold value Th in time periods A1 and A2 with respect to a road A, and the rate of change exceeds the threshold value Th in a time period C1 with respect to a road C. There is no time period when the rate of change exceeds the threshold value Th with respect to a road B. In this illustrated example, the base date is set, based on an overlapping time period SD when the time periods A1 and A2 detected for the road A are overlapped with the time period C1 detected for the road C. This is because the change of the road network in the time periods A2 and C1 is considered as a common change affecting both the roads A and C and is thus regarded as highly important.

After determining the base date, the CPU calculates a traffic change of each road, based on the traffic volumes in time periods before and after the base date (step S30). Such calculation corresponds to the process of determining the amount of change A described above with reference to FIG. 3. The amount of change may be shown by a variation in number of passing vehicles or a rate of change (%). The road having a significant traffic change is identified as part affected by the change of the road network as described later. This road is called the change-related road according to this embodiment.

D. Setting Survey Route

The following describes a method of setting a survey route. According to this embodiment, the change-related road is identified based on the change in traffic volume. The reason causing this change in traffic volume is specified by field survey and is to be reflected on the road network data. The analysis of probe information alone is insufficient but the field survey is essential for reflection of accurate information on the road network data. For the efficient field survey, the analysis terminal 200 of the embodiment may narrow the parts expected to have a change in road network, i.e., the candidates of a survey area or a survey route for the field survey.

D1. Concept of Setting Survey Route

FIGS. 5A and 5B are diagrams showing the concept of setting a survey route. As shown in FIG. 5A, the road network is assumed to have links L1 to L16 and nodes N1 to N4. It is also assumed that a bypass BPS (shown by the broken line) is newly opened to traffic.

It is further assumed that most users pass through a route Ra1 (links L1, L3, L6 and L16) before the bypass BPS is opened to traffic. After the bypass BPS is opened to traffic, the users are expected to use the bypass BPS and pass through a route Ra2 (links L1 and L7), the bypass BPS and a route Ra3 (link L16). There is no road network data on the bypass BPS, so that the probe information cannot identify whether each probe car passes through the bypass BPS. While the probe car runs on the bypass BPS, the probe information fails map matching to any link including the link L12 to be treated as an error (see FIG. 2). The probe information accordingly indicates that the probe car suddenly disappears when entering the node N3 and suddenly appears when entering the node N2.

The change of the traffic flow described above may cause a change in traffic volume of each link. The traffic volume decreases on the links L3 and L6 (shown by the double line of solid line and broken line) since the previous users pass through the link L7. The traffic volume increases, on the contrary, on the links L7 and L16 (shown by the thick line) since by bypass users passes through these links. There are no significant changes in traffic volume with respect to the other links. The links L3, L6, L7 and L16, each having the significant increase or decrease in traffic volume, are change-related roads.

Nodes on respective ends of the change-related roads (nodes N1 to N4) are closely related nodes for setting the survey route. According to this embodiment, like the nodes N1 and N2, any node corresponding to an intersection between the link of the increased traffic volume and the link the decreased traffic volume is called "important node". Like the node N4, any other node of the change-related road is called "attentive node". Additionally, the nodes N3 and N2 are called "singular nodes" as described later in detail.

It is not clear yet whether all the nodes on respective ends of the change-related roads (nodes N1 to N4) are affected by a single change of the road network. In the illustrated example of FIGS. 5A and 5B, all the nodes N1 to N4 are clearly affected by construction of the bypass BPS, but such influence is not identifiable by simple analysis of the traffic change.

In order to identify any relevant combination of nodes affected by the single change of the road network, the procedure performs route search with respect to all the possible combinations between two points among these nodes N1 to N4. The procedure then selects a route having the greater degree of overlap with the change-related roads among the routes found as the results of route search and specifies nodes of the selected route as relevant nodes. In the illustrated example of FIGS. 5A and 5B, the route between the nodes N1 and N2 is overlapped with the links L3 and L6 and is thus selected as the route fully overlapped with the change-related roads. The nodes N1 and N2 on both ends of this selected route are then specified as relevant nodes.

The route between the nodes N1 and N4 and the route between the nodes N2 and N4 are also overlapped with the change-related roads L3 and L6. Each of the nodes N1 and N2 is either an "important node" or a "singular node" of greater importance, while the node N4 is an "attentive node" of less importance. The route between the nodes N1 and N2 is thus selected preferentially.

After specification of the relevant nodes, the procedure sets the route connecting the specified relevant nodes as the survey route. As clearly understood from the location where the bypass BPS is opened to traffic, it is preferable to set a route passing from the node N1 through the link L7 as the survey route. According to this embodiment, the following procedure is employed to specify the survey route.

FIG. 5B shows a procedure of specifying the survey route. The procedure first excludes the change-related roads (links L3 and L6) subjected to the route search for specification of relevant nodes from the object of search. Alternatively the links of the increased traffic volume and the links of the decreased traffic volume may be excluded from the object of search. In the illustrated example of FIG. 5A, the links L3 and L6 are excluded. FIG. 5B shows the state after such exclusion.

The procedure then sets a survey area AA including the nodes N1 and N2. The extent and the shape of the survey area AA may be set arbitrarily. Route search is performed between nodes in the periphery of this survey area AA, and a route having the greater degree of overlap with the change-related roads located in the survey area AA is selected as the survey route.

In the illustrated example of FIG. 5B, a route between nodes S and D (arrows Rb1 to Rb3) is overlapped with the links L7 and L16 as the change-related roads and is thus specified as the search route. Field survey along the specified survey route enables opening of the bypass BPS to be readily found when the probe car runs along the link L7, when there is no obstacle between the link L7 and the bypass BPS.

D2. Detection of Singular Node

The foregoing describes the "important node" and the "attentive node" and specifies each of the nodes N3 and N2 as a "singular node" with reference to FIG. 5A. The following describes the definition of the singular node and the method of detecting the singular node.

Figure 6A:
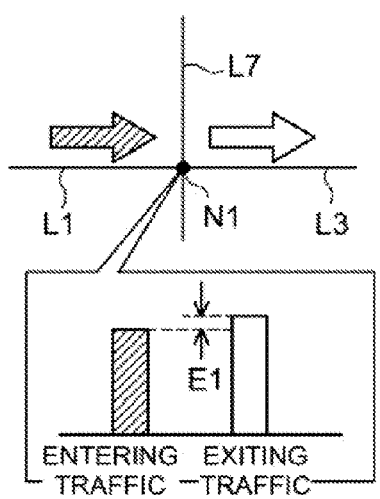
Figure 6B:
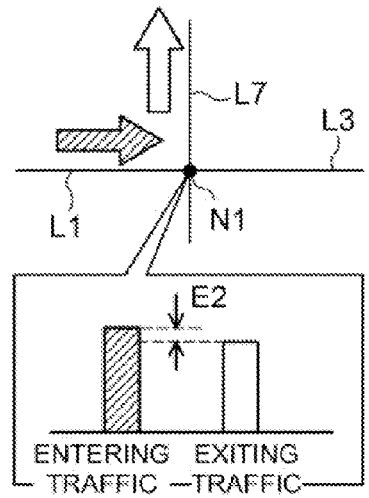
Figure 6C:
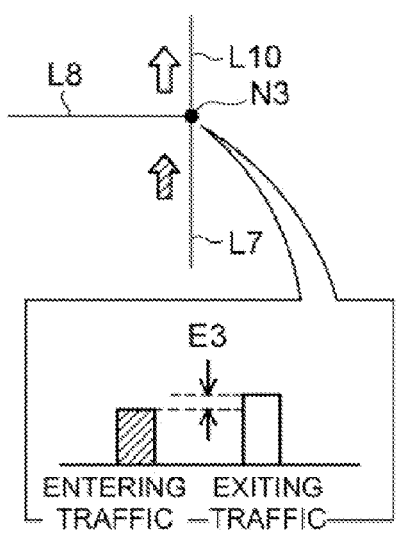
Figure 6D:
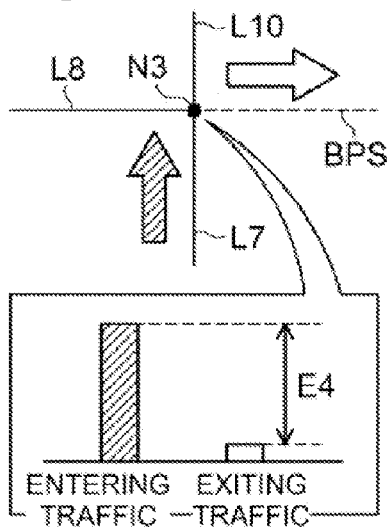
Figure 6E:
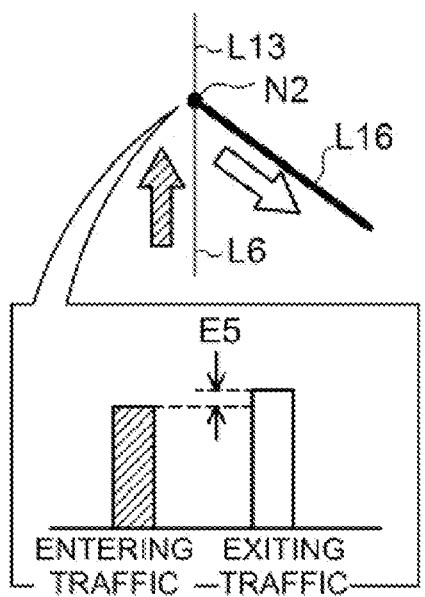
Figure 6F:
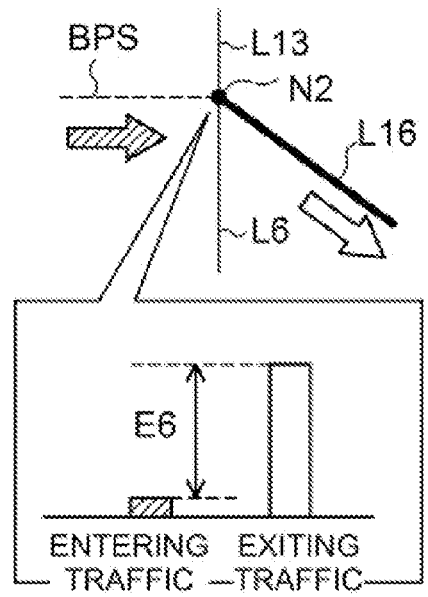

FIGS. 6A through 6F are diagrams showing the concept of detecting the singular node. FIGS. 6A through 6F respectively show changes of the total traffic volume entering to the node and the total traffic volume exiting from the node with respect to the nodes N1, N3 and N2 shown in FIG. 5A. FIGS. 6A, 6C, and 6E show the state before the bypass BPS is opened to traffic, and FIGS. 6B, 6D, and 6F show the state after the bypass BPS is opened to traffic.

As shown in FIG. 6A, before the bypass BPS is opened to traffic, the main traffic flow is entering the node N1 from the link L1 and exiting from the node N1 to the link L3. The traffic volume entering the node and the traffic volume exiting from the node are shown as the bar graph. If the probe information accurately indicates the traffic volume entering the node N1 and the traffic volume exiting from the node N1, these two traffic volume should be equal to each other. There is, however, actually a difference E1 between the entering traffic and the exiting traffic, due to a detection error.

As shown in FIG. 6B, after the bypass BPS is opened to traffic, the main traffic flow is entering the node N1 from the link L1 and exiting from the node N1 to the link L7. There is a difference E2 between the entering traffic and the exiting traffic, due to detection error of the probe information. In the illustrated example, the entering traffic is less than the exiting traffic before opening of the bypass BPS, while the entering traffic is greater than the exiting traffic after opening of the bypass BPS. This example only illustrates that there may be any of various differences between the entering traffic and the exiting traffic and does not necessarily mean the occurrence of such reverse phenomenon.

Similarly a change with respect to the node N3 is observed. As shown in FIG. 6C, before the bypass BPS is opened to traffic, the main traffic flow is entering the node N3 from the link L7 and exiting from the node N3 to the link L10. There is a difference E3 between the entering traffic and the exiting traffic, due to a detection error of the probe information. As shown in FIG. 6D, after the bypass BPS is opened to traffic, the main traffic flow is entering the node N3 from the link L7 and exiting from the node N3 to the bypass BPS. The traffic volume entering from the link L7 increases, compared with the traffic volume before opening of the bypass BPS. As described previously, no probe information is obtained from the vehicle exiting to the bypass BPS. The traffic volume exiting from the node N3 is thus counted only for the vehicles exiting to the links other than the bypass BPS and apparently seems to be significantly reduced. As a result, there is a significant difference E4 between the entering traffic and the exiting traffic, which is not attributable to a detection error of the probe information.

FIGS. 6E and 6F show a change with respect to the node N2. As shown in FIG. 6E, before the bypass BPS is opened to traffic, the main traffic flow is entering the node N2 from the link L6 and exiting from the node N2 to the link L16. There is a difference E5 between the entering traffic and the exiting traffic, due to a detection error of the probe information.

As shown in FIG. 6F, after the bypass BPS is opened to traffic, the main traffic flow is entering the node N3 from the bypass BPS and exiting from the node N2 to the link L16. Since no probe information is obtained from the vehicle exiting to the bypass BPS, the traffic volume entering the node N2 is counted only for the vehicles entering from the links other than the bypass BPS and apparently seems to be significantly reduced. As a result, there is a significant difference E6 between the entering traffic and the exiting traffic, which is not attributable to a detection error of the probe information.

As clearly shown in FIGS. 6B and 6C, in some state of change of the road network, there may be a significant difference between the traffic entering the node and the traffic exiting from the node, which is not attributable to a detection error of the probe information. The node having such a significant difference is specified as an extremely singular node that has a change of the road network very close to the node.

D3. Determination of Relevancy Between Nodes

FIGS. 5A and 5B illustrate the example of determining the relevancy between nodes in a relatively narrow area. When a wide area is specified as the target area to be analyzed for a change in road network, another factor may cause a change in traffic volume in some of the change-related roads. Even in this case, the relevancy between nodes is determinable by the method using the route search described above with reference to FIG. 5A.

FIG. 7 is a diagram showing a method of determining the relevancy between nodes. The nodes N1, N2 and N3 in this illustrated example correspond to the area shown in FIG. 5A and the bypass BPS is constructed in this area. In the drawing, the thick line (links L7, L16 and L20) represents the change-related roads having the increased traffic volume, and the double line of solid line and broken line (links L3, L6 and L21) represents the change-related roads having the decreased traffic volume. The links L20 and L21 shown in the right upper side of the drawing are also change-related roads, which are, however, undoubtedly caused by another factor different from opening of the bypass BPS.

Each of the nodes N1 to N3 and the node N10 is either a singular node or an important node. In order to examine the relevancy between the nodes N1 to N3 and the node N10, the procedure performs route search with setting these nodes as endpoints. In order to avoid the complexity of illustration, all routes are not illustrated, but routes R71 to R74 are specified according to combinations of nodes.

The procedure then selects a route having the higher degree of overlap with the change-related roads among the provided routes.

The route R71 is fully overlapped with the change-related roads L3 and L6 of the decreased traffic volume and is thereby selected. The route R72 is not at all overlapped with the change-related roads and is thereby excluded.

The route R73 is overlapped with the link L20, and the route R74 is overlapped with the links L20 and L7. The route R73 and the route R74, however, have the lower degree of overlap than that of the route R71 and are thereby excluded.

The route R71 is accordingly selected, and the nodes N2 and N3 on both ends of the selected route R71 are specified as relevant nodes. With respect to the node having a change in traffic volume caused by another factor different from opening of the bypass BPS, like the links L20 and L21, a route passing through the roads irrelevant to the change in traffic volume is found as the result of route search as shown in FIG. 7. The route as the result of route search accordingly has the lower degree of overlap with the change-related roads, so that this node is specified as the irrelevant node.

D4. Survey Route Setting Process

FIGS. 8 and 9 are flowcharts showing the survey route setting process. The survey route setting process corresponds to the processing of the road network change determination unit 213 (see FIG. 1) and is executed by the CPU of the analysis terminal 200 as the hardware. The CPU first extracts any node having the difference between the traffic entering the node and the traffic exiting from the node after the base date equal to or greater than a threshold value Eth, as a singular node (step S50). Such extraction is the process described above with reference to FIGS. 6A through 6F. The threshold value Eth is used as a reference value to determine whether the difference between the traffic entering the intersection and the traffic exiting from the intersection is significant and is not attributable to a detection error of the probe information. The detection error of the probe information may be measured in advance, and any value exceeding the detection error may be set to the threshold value Eth.

The CPU subsequently extracts any link having the absolute value of traffic change that is greater than a threshold value δ, as a change-related link (step S52). The change-related link of the increased traffic volume is called "increasing link", and the change-related link of the decreased traffic volume is called "decreasing link". The traffic change (corresponding to A in FIG. 3) may be expressed by the number of passing vehicles or by the rate of change. The threshold value δ used for determining whether or not each link is the change-related link may be set arbitrarily. A large threshold value δ decreases the sensitivity of detection of the change in road network. An excessively small threshold value δ, on the other hand, detects even the influence that is unlikely to be attributed to the change in road network. The threshold value δ may be set to balance between such results.

The CPU then extracts any node at which the increasing link and the decreasing link cross as an important node (step S54), and extracts endpoints of the other increasing links and decreasing links as attentive nodes (step S56). The attentive nodes include an intersection between increasing links, an intersection between decreasing links and an intersection between a road other than the change-related roads and the increasing link or the decreasing link.

In order to specify the relevancy between the extracted singular nodes, important nodes and attentive node, the CPU subsequently performs route search between these nodes and extracts routes passing through the increasing link or the decreasing link (step S58). When a large number of nodes are extracted, the route search may be performed with exclusion of attentive nodes.

On completion of the route search, the CPU selects one route according to the following conditions (step S60):

Condition 1: having the higher rate of increasing links and decreasing links; and
Condition 2: passing through the node of the higher priority.

The priority descends in the order of "singular node", "important node" and "attentive node". In the event of failure to select one route by only the condition 1, the CPU considers the condition 2.

When one route is selected, both ends of the selected route are specified as relevant nodes. The CPU sets an area including the selected route as a survey area (step S62). This corresponds to the area AA in FIG. 5B. The CPU then excludes the decreasing links in the survey area from the object of search and performs route search between nodes in the neighborhood of the survey area (step S64). This process corresponds to the processing described in FIG. 5B. The target of exclusion may be the change-related links on the route selected at step S60 in place of the decreasing links or may be the increasing links in place of the decreasing links.

The CPU then specifies a route having the higher rate of increasing links among the results of route search performed at step S64, as a survey route (step S66). Since the decreasing links are excluded at step S64, the rate of increasing links is used to specify the survey route. When the increasing links are excluded at step S64, on the other hand, the rate of decreasing links may be used for the same purpose.

This process can thus specify the survey route for efficiently detecting a change in road network as shown in FIG. 5B.

E. Advantageous Effects

The road network analysis system of the embodiment can detect the presence or the absence of any significant change in road network affecting the traffic, based on the results of analysis of the probe information. The method using the route search can specify the survey route for efficient field survey of the change in road network.

The above embodiment describes the example where a road, for example, a bypass, is newly opened to traffic. The concept of the embodiment is, however, not limited to this example but is similarly applicable to the case of closing or blocking an existing road. When the existing road is closed or blocked, there is a traffic change by decreasing the traffic volume on the existing road and instead increasing the traffic volume on another road. The concept of the embodiment can thus be similarly employed for such cases to detect a significant change in road network that affects the traffic.

The foregoing describes the embodiment of the invention. The road network system may not have all the functions of the embodiment described above but may implement only part of the functions. The road network system may have additional functions.

The invention is not limited to the above embodiment but various modifications and variations may be made to the embodiment without departing from the scope of the invention. For example, the hardware configuration of the embodiment may be replaced with the software configuration and vice versa.

INDUSTRIAL APPLICABILITY

The invention is applicable to detect a significant change in road network that may affect the traffic and support upgrading of map data.

What is claimed is:

1. A road network analysis system that analyzes a change in a road network based on probe information regarding a traveling path, the road network analysis system comprising:
a probe information storing unit configured to store the probe information in time series with respect to a plurality of vehicles;
a road network data storing unit configured to store road network data including links and nodes representing roads and intersections of the road network;
a traffic quantity analysis unit configured to read probe information of a road network in a target area to be analyzed for a predetermined time period before and after a specified reference time from the probe information storing unit, and to correlate the read probe information to the road network data so as to calculate, for each of existing roads in the road network, a first traffic volume for the predetermined time period before the specified reference time and a second traffic volume for the predetermined time period after the specified reference time;

a road network change determination unit configured to determine a road having a difference between the first traffic volume and the second traffic volume equal to or greater than a predetermined value as a change-related road involved in a change in the road network in a neighborhood of the road; and a route search unit configured to perform a route search between two specified points based on the links and nodes in the road network data, wherein the road network change determination unit is further configured to determine a plurality of change-related roads in the neighborhood and specify endpoints of the plurality of change-related roads, to control the route search unit to perform a route search between the specified endpoints, and to extract a route overlapped with the change-related roads from among routes found by the route search.

2. The road network analysis system according to claim 1, wherein the traffic quantity analysis unit calculates the traffic volume for the predetermined time period before and after the specified reference time by performing at least one of:

a process of selectively reading the probe information based on an attribute of the road network in the target area to be analyzed; and a process of normalizing the read probe information by a total sample number of the probe information in the predetermined time period, or a total sample number of the probe information in a predetermined unit time period if the probe information is stored in time series by the predetermined unit time period.

3. The road network analysis system according to claim 1, wherein the road network change determination unit further controls the route search unit to perform the route search between the nodes corresponding to endpoints of the extracted route after excluding either a link corresponding to the change-related road of increased traffic volume or a link corresponding to the change-related road of decreased traffic volume, and extracts a route overlapped with links corresponding to the remaining of the plurality of change-related roads from among routes found by the route search.

4. The road network analysis system according to claim 1, wherein the change in the road network includes at least one of opening of a new road and blocking or closure of an existing road corresponding to an addition or removal of the links and nodes in the road network data.

* * * * *